United States Patent

Suzuki et al.

[11] Patent Number: 5,360,378
[45] Date of Patent: Nov. 1, 1994

[54] CHAIN DRIVE MECHANISM HAVING IMPROVED NOISE REDUCTION

[75] Inventors: Tadasu Suzuki, Chicopee, Mass.;
Shigekazu Fukuda, Tokorozawa;
Masahiro Satoh, Sakado, all of Japan

[73] Assignee: Tsbakimoto Chain Co., Osaka, Japan

[21] Appl. No.: 118,422

[22] Filed: Sep. 8, 1993

[30] Foreign Application Priority Data

Sep. 14, 1992 [JP] Japan ............... 4-070028[U]

[51] Int. Cl.⁵ ............................................ F16H 55/30
[52] U.S. Cl. ............................................ 474/161
[58] Field of Search .................. 474/152, 161, 77–79

[56] References Cited

U.S. PATENT DOCUMENTS 4,869,709  9/1989  Nagano ..................... 474/161 X

Primary Examiner—Michael Powell Buiz
Attorney, Agent, or Firm—Howson & Howson

[57] ABSTRACT

Noise produced by a chain drive mechanism is significantly reduced by providing rubber rings on the faces of a sprocket, with the rubber rings dimensioned so that they are not contacted by the chain as it comes into engagement with the sprocket. The rubber rings absorb sprocket vibration and are as effective in reducing noise as are conventional rubber rings which are contacted by link plates of a chain to alleviate the effects of collision shocks. Since the rings need not be contacted by the chain, it is possible to reduce their thicknesses so that the sprocket can be utilized in restricted spaces.

7 Claims, 5 Drawing Sheets

CHAIN DRIVE MECHANISM HAVING IMPROVED NOISE REDUCTION

BRIEF SUMMARY OF THE INVENTION

This invention relates to chain drives, and more particularly to an improvement in a chain drive for reducing the noise generated thereby.

In the operation of a chain drive mechanism comprising a chain engaged with the peripheral teeth of a sprocket, it is desirable to minimize the noise produced as the sprocket rotates. It has been generally believed that the noise produced in the operation of a chain drive was caused primarily by vibration of the chain resulting from the shock of collision of the elements of the chain with the sprocket. One approach to this problem has been to attempt to relieve the collision shocks by providing, ring-shaped rubber plates on both sides of the sprocket. The link plates of the chain, which extend radially inwardly beyond the roots of the sprocket teeth as the chain begins to engage the sprocket, contact the peripheries of these rubber plates, thereby alleviating collision shocks.

The use of ring-shaped rubber plates has been successful in reducing noise generated in the operation of the chain drive. However, the rubber plates are subject to several drawbacks. In particular, because the rubber plates are repetitively contacted by the chain, they cannot withstand long-term use. Furthermore, the plates have a tendency to form cracks at the locus of their contact with the chain. As the cracks develop, parts of the plates can be torn off and find their way into other parts of the machinery, where they can interfere with proper operation, or cause damage.

The useful life of the rubber plates can be improved, and their tendency to break up can be alleviated by the use of special abrasion and crack-resistant materials. However such materials are expensive, and increase the cost of the rubber plates. Still another problem with the rubber plates is that they must be thick enough to extend axially outward from the side of the sprocket to or beyond the link plates of the chain. Therefore, the rubber plates need to be quite thick, and cannot be used where only a narrow space is available to the side of the sprocket.

The principal object of this invention is to provide a chain drive mechanism in which noise reduction is achieved without the several problems associated with conventional rubber sprocket face plates, such as cracking and breaking up of the rubber. It is also an object of the invention to achieve noise reduction at reduced expense. A still further object of the invention is to provide a noise-reducing sprocket which requires less space than a conventional noise-reducing sprocket.

In accordance with this invention, noise reduction is achieved in a chain drive mechanism comprising a sprocket having peripheral teeth and a chain engaged with said teeth, by an elastic body fixedly mounted on at least one side of the sprocket. Unlike the rubber plates of the prior art, the elastic body in accordance with the invention is of a size, and in a position such, that it is not contacted by the chain as the sprocket rotates.

In the operation of the chain drive mechanism wherein elastic bodies on the side faces of a sprocket are not contacted by the chain, it would be expected that the noise generated as a result of collision of the elements of the chain with the sprocket would be comparable to the noise generated by a conventional chain and sprocket mechanism. Surprisingly, however, tests have shown that elastic bodies fixed to the faces of the sprocket and positioned so that they are not contacted by the chain are capable of reducing noise as well as elastic bodies which are contacted by the chain. Accordingly, the invention makes it possible to achieve effective noise reduction while avoiding the problems associated with conventional rubber sprocket face plates.

Further objects, details and advantages of the invention will be apparent from the following detailed description when read in conjunction with the drawings.

DETAILED DESCRIPTION

Figure 6:
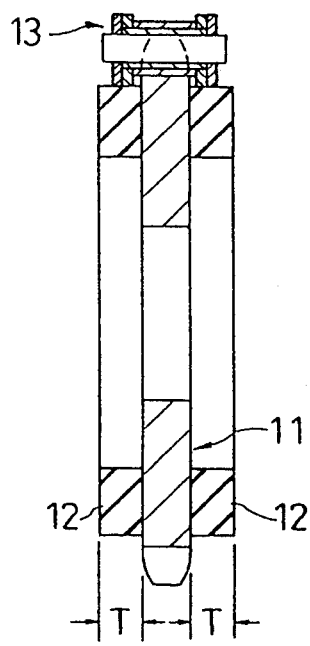
FIG. 6 is an axial section showing a chain drive mechanism equipped with rubber face plates in accordance with the prior art.
Figure 7:
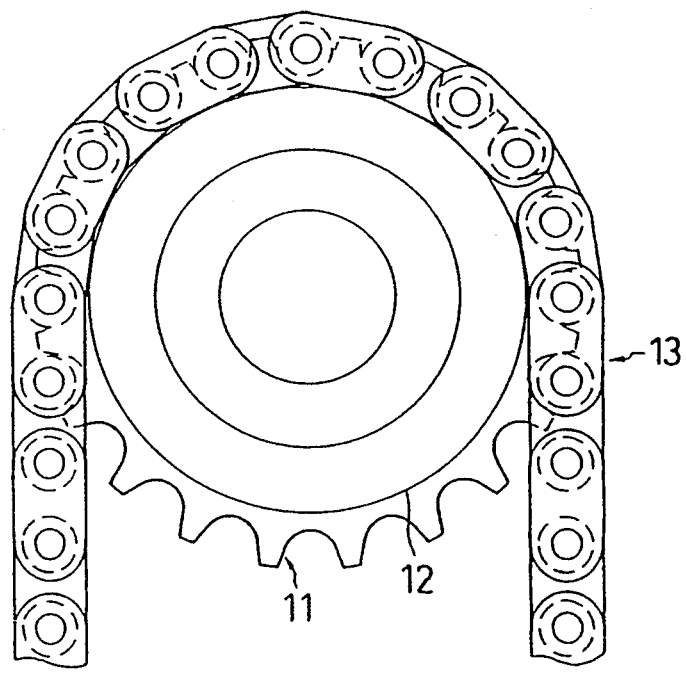
FIG. 7 is a fragmentary right side elevation of the chain drive of FIG. 6.

In the conventional noise-reduced chain drive mechanism shown in FIGS. 6 and 7, a sprocket 11 is engaged by a chain 13. The chain is a conventional drive chain having transverse pins extending between outer or "pin" link plates on both sides of the chain, and sprocket tooth-engaging rollers disposed on bushings located between inner or "roller" link plates. The pins extend through the outer link plates, the inner link plates and the bushings to hold the elements of the chain together. Thus, there are pin link plates and roller link plates on both sides of the chain. The link plates extend radially, beyond the roots of the sprocket teeth, toward the axis of rotation of the sprocket. Ring-shaped plates 12, made of rubber, are provided on both faces of the sprocket. The sizes and positions of the ring-shaped plates are such that their outer peripheries are engaged by the inner edges of the link plates of chain 13 as the pins of the chain approach engagement with the sprocket teeth. As seen in FIG. 6, the rubber plates 12 have a thickness T such that they extend axially, beyond the link plates of the chain, on both sides of the sprocket, so that their peripheries can be engaged by the link plates.

As mentioned previously, it was believed that the noise generated in the operation of a chain drive mechanism was caused primarily by chain vibration resulting from the shock of engagement of the chain with the sprocket. Thus, the purpose of the engagement of the link plates of the chain 13 with the rubber plates 12 was to alleviate the shock of collision of the chain with the sprocket, and thereby decrease vibration of the chain and sprocket caused by the collisions. Unfortunately, the continuous engagement of the chain with the rubber plates caused various problems related to wear and impact, which were overcome only by the use of more expensive abrasion resistant, crack-free rubber plates. In addition, the plates needed to be thick enough that their peripheries could be engaged by the link plates of the chain, and consequently it was not possible to position a sprocket with noise-reducing rubber plates in a very restricted space.

Figure 1:
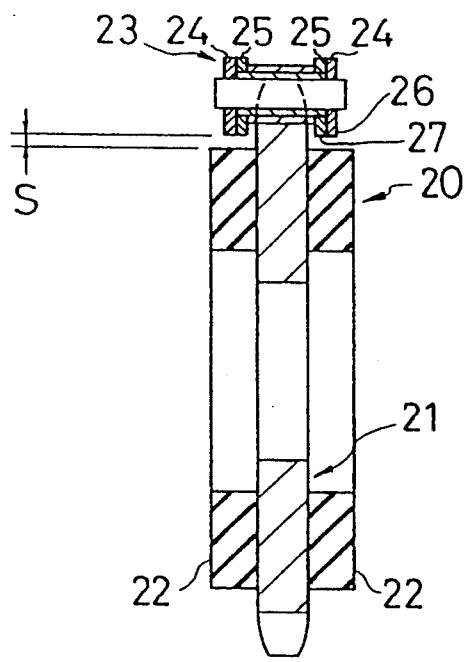
FIG. 1 is an axial section of a part of a chain drive mechanism in accordance with the invention, taken through a sprocket equipped with elastic face plates positioned so that they do not come into contact with the chain.
Figure 2:
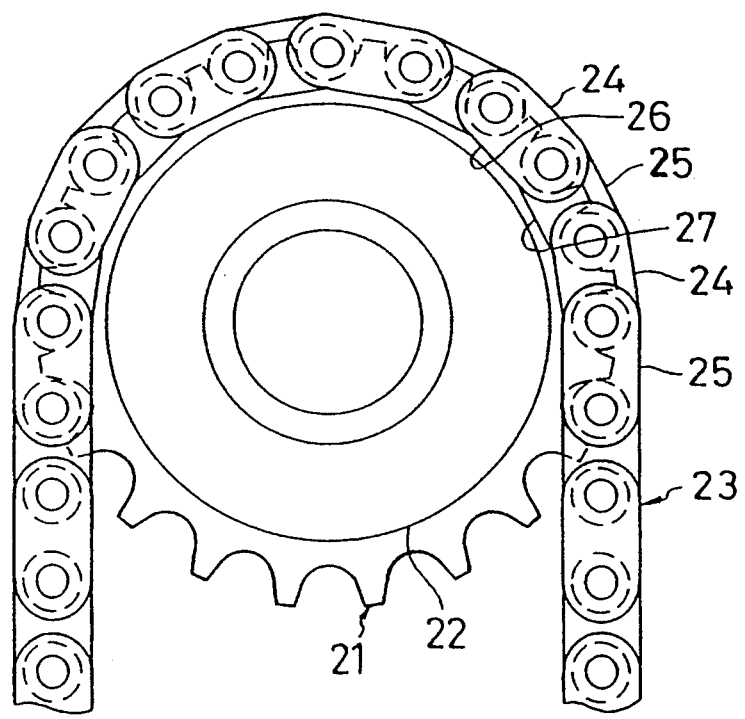
FIG. 2 is a fragmentary right side elevation of the chain drive of FIG. 1.

Referring now to FIGS. 1 and 2, a mechanism 20 in accordance with the first embodiment of the invention comprises a conventional roller chain 23 engaged with a sprocket 21. The sprocket is provided, on each of its side faces, with a ring-shaped elastic body 22, which can be of rubber or other material., for example a plastics material exhibiting an elasticity similar to that of rubber. The elastic bodies can be affixed to the faces of the sprocket by adhesive, or by baking. The elastic bodies are coaxial with each other and with the sprocket. Their outside diameters are such that there is a clearance S between the peripheries of the elastic bodies and the inner edges 26 of the pin link plates 24 and the inner edges 27 of the roller link plates 25.

Because of the clearance S, the chain engages the sprocket without its link plates, or any other parts, coming into contact with the elastic bodies 22.

Figure 3:
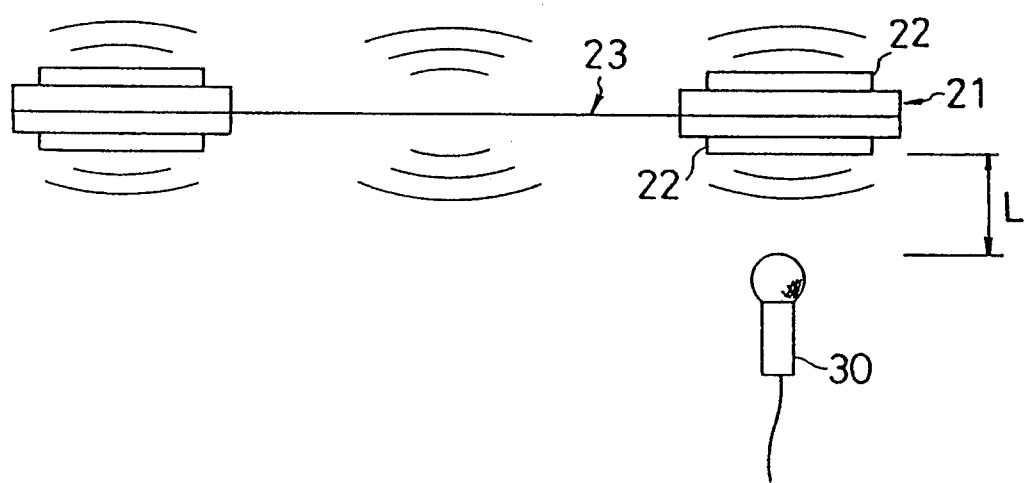
FIG. 3 is a schematic plan view illustrating the testing of a chain drive mechanism for noise.
Figure 4:
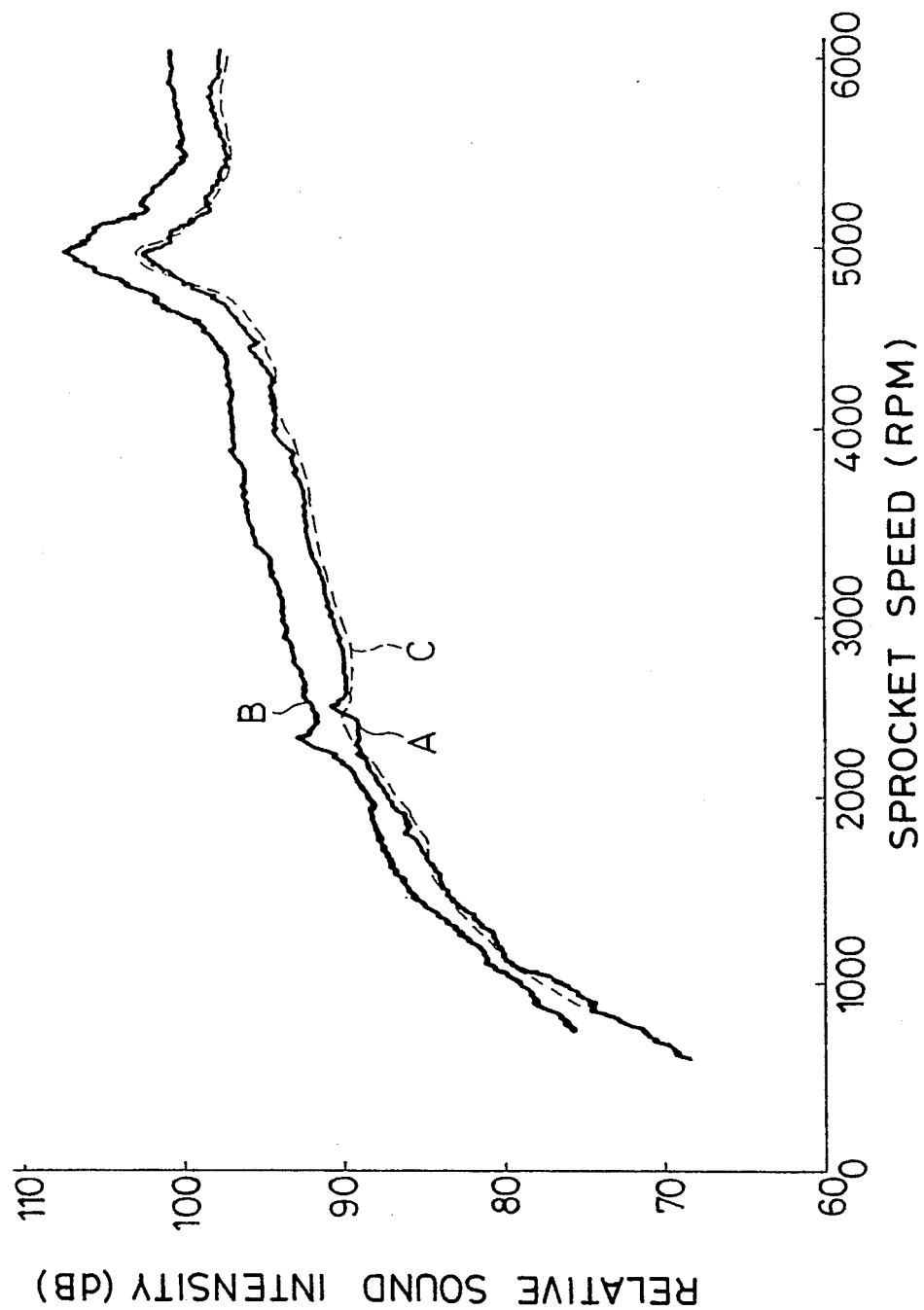
FIG. 4 is a graph illustrating test data comparing the noise produced by a chain drive mechanism in accordance with the invention with a conventional chain drive, and with a chain drive equipped with noise-reducing rubber sprocket face plates in accordance with the prior art.

Tests were conducted to compare the noise produced by a chain drive mechanism having a gap S, as shown in FIG. 1, with a conventional chain drive, and with a chain drive equipped with noise-reducing rubber sprocket face plates in accordance with the prior art, as shown in FIGS. 6 and 7. The tests were carried out using the test set-up depicted in FIG. 3, wherein a microphone 30 was positioned at a distance L from one of two sprockets drivingly connected by a chain. FIG. 3 shows a chain 23 engaged with a sprocket 21 equipped with two rubber plates 22, in accordance with the invention, on its opposite side faces. In each case, the sprockets and chains were identical. The only differences between the tests were that, in one case, the sprocket had no rubber plates, in a second case the sprocket had rubber plates engageable by the link plates of the chain, and in the third case, the rubber plates were of a size such as to leave a gap between their peripheries and the link plates of the chain. The test data are depicted in FIG. 4, in which the ordinates represent relative sound intensity in decibels produced by the entire tested apparatus, as detected by the microphone, and the abscissae represent rotational speed of the sprocket adjacent to the microphone. Curve A represents the sound produced by a chain drive according to the invention, as depicted in FIGS. 1 and 2, wherein the rubber plates are not contacted by the chain. Curve B represents the sound produced by a conventional chain drive having no rubber plates. Curve C represents the sound produced by a chain drive as depicted in FIGS. 6 and 7, where the chain comes into contact with the rubber plates.

As shown by FIG. 4, the amount of noise produced by the chain drive mechanism in accordance with the invention (curve B) was significantly lower than the noise produced by a conventional chain drive mechanism having no rubber plates (curve A), and much the same as the noise produced by a chain drive mechanism in which rubber plates are contacted by the chain (curve C). There was no appreciable difference between curves A and C, and no noticeable difference in the sounds produced with the mechanisms of FIGS. 1 and 6. From the tests, it became apparent that the noise produced in a chain drive mechanism by the vibration of the sprocket is greater than the noise resulting from vibration of the chain, and that elastic bodies on the sprocket side faces which do are not contacted by the chain are just as effective in reducing noise, as elastic bodies which are contacted by the chain. The elastic bodies of the invention reduce noise by absorbing sprocket vibrations.

The noise reduction mechanism in accordance with the invention, in which the elastic bodies are not contacted by the chain, is usable for a long period of time without the need for repair or replacement of parts, since the elastic bodies are not subjected to wear, cracking, or other damage by contact with the chain. Furthermore, the likelihood that pieces of the elastic bodies will be torn off and impede the operation of the drive mechanism or other machinery is significantly reduced. It is not necessary to use expensive, abrasion-resistant and crack-resistant materials for the elastic bodies.

Figure 5:
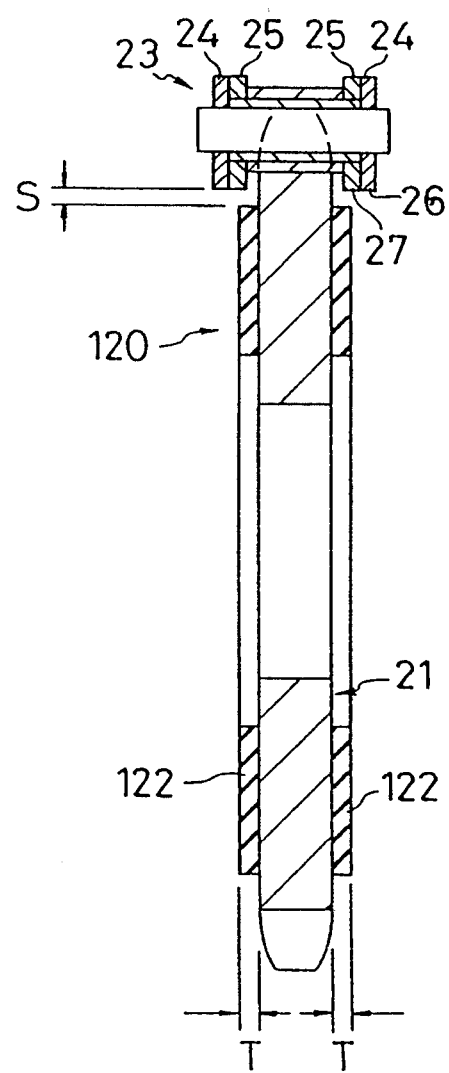
FIG. 5 is an axial section, corresponding to FIG. 1, showing a second embodiment of the invention.

Various modifications can be made to the invention depicted in FIGS. 1 and 2. For example, as shown in FIG. 5, the thickness of the elastic bodies can be significantly decreased. Elastic bodies 122 in mechanism 120 have thicknesses such that, unlike the elastic bodies 22 in FIG. 1, they do not extend axially beyond the link plates of the chain. Thus, the sprocket of FIG. 5 can be utilized in mechanisms where only a narrow space is available.

Other modifications can be made to the chain drive mechanism in accordance with the invention. For example, while elastic bodies on both sides of the sprocket are shown in FIGS. 1 and 5, it is possible to realize advantages of the invention in an embodiment in which an elastic body is disposed only on one side of the sprocket. Furthermore, the elastic body, while preferably symmetrical so as to avoid causing vibration due to unbalance, need not be in the form of a ring having a circular periphery. Since it is not contacted by the chain, it can be formed in any of various shapes, so long as its size and weight are such that it substantially reduces the noise generated by vibration of the sprocket. The noise reduction mechanism of the invention may, of course, be used in chain drives having various types of chains other than conventional roller chains. Still other modifications, which will occur to persons skilled in the art, can be made to the apparatus described herein without departing from the scope of the invention as defined in the following claims.

We claim:

1. An improved chain drive mechanism comprising a sprocket having peripheral teeth and a drive chain engaged with said teeth, the improvement comprising:
   an elastic body fixedly mounted on at least one side of the sprocket, the elastic body being of a size and weight sufficient to absorb vibration of said sprocket, the outer periphery of said elastic body forming with the inner periphery of said drive chain a radial gap therebetween;
   whereby said elastic body cannot contact said drive chain when said drive chain is fully engaged in said sprocket teeth.

2. A chain drive mechanism having improved noise reduction comprising, in combination:
   a sprocket consisting of a unitary rotatable member having opposed faces and peripheral teeth, and having a central opening for receiving a shaft, the sprocket being directly engageable with a shaft received in said central opening, whereby the sprocket is rotatable about the axis of the shaft;

a chain engaged with said teeth, said chain having link plates at both faces of said sprocket, and said plates having inner edges and extending radially beyond the roots of said sprocket teeth toward the axis of rotation of said sprocket; and means, comprising an elastic body coaxial with said sprocket and fixedly mounted on at least one face of said sprocket, for absorbing vibration of said sprocket, there being a radial clearance between the periphery of said elastic body and said inner edges of the link plates on said one face of the sprocket.

3. A chain drive mechanism according to claim 2 wherein said elastic body is sized and weighted for effectively absorbing vibration of said sprocket during rotation thereof.

4. A chain drive mechanism according to claim 3 wherein said elastic body is ring-shaped and coaxial with said sprocket.

5. A chain drive mechanism according to claim 3 wherein said link plates extend axially beyond said elastic body.

6. A chain drive mechanism according to claim 3 wherein said elastic body is affixed to both faces of said sprocket, there being a radial clearance between the periphery of said elastic body on each face of the sprocket the inner edges of the link plates on the same face of the sprocket.

7. A chain drive mechanism according to claim 3 wherein said central opening is circular.

* * * * *